United States Patent

Konishi et al.

Patent Number: 6,056,196
Date of Patent: May 2, 2000

[54] OPTICAL READING APPARATUS HAVING ACTIVE AND PASSIVE POWER SOURCE SWITCHING CIRCUITRY AND A STAND THEREOF

[75] Inventors: Masayuki Konishi, Chita-gun; Yoshimi Kitazumi, Chiryu, both of Japan

[73] Assignee: Denso Corporation, Kariya, Japan

[21] Appl. No.: 08/966,038

[22] Filed: Nov. 7, 1997

[30] Foreign Application Priority Data

Nov. 8, 1996 [JP] Japan ..................................... 8-296675

[51] Int. Cl.[7] ....................................................... G06K 7/10
[52] U.S. Cl. ................ 235/454; 235/462.45; 235/472.02
[58] Field of Search .................................. 235/454, 382, 235/383, 385, 449, 451, 462.45, 462.46, 462.48, 472.01, 472.02, 492; 340/825.31, 825.32, 825.34, 825.54

[56] References Cited

U.S. PATENT DOCUMENTS

| | | | |
|---|---|---|---|
| 4,160,251 | 7/1979 | Lazarchik et al. | 343/100 |
| 4,814,595 | 3/1989 | Gilboa | 235/492 |
| 5,347,263 | 9/1994 | Carroll et al. | 235/382 X |
| 5,360,967 | 11/1994 | Perkin et al. | 235/375 |
| 5,640,002 | 6/1997 | Ruppert et al. | 235/472.01 |

FOREIGN PATENT DOCUMENTS

| | | |
|---|---|---|
| 1-102956 | 7/1989 | Japan . |
| 3-233785 | 10/1991 | Japan . |
| 5-189593 | 7/1993 | Japan . |

*Primary Examiner*—Michael G Lee
*Attorney, Agent, or Firm*—Pillsbury Madison & Sutro LLP

[57] ABSTRACT

An optical reading apparatus with which, when it is not being driven, the power supply to most parts is turned off and wasteful battery consumption is prevented, when the host computer side finishes processing with respect to the bar code reader handy terminal 2 and extinguishes the light-emitting device 30, because the light-receiving device 28 of the power supply part 70 transmits a power supply control signal indicative of driving the power supply OFF, the switching circuit 74 turns off the driving power supply from the battery 72 to the processor 40 and the functioning of the processor 40 stops. Because the processor 40 has its power supply turned on by the host computer due to this, at times of waiting for instructions from the host computer side that which is driven is the power supply part 70 only. Because the consumption of the storage battery 72 of driving of the power supply part 70 is extremely low compared with driving of the stand 4, needless consumption of the battery 72 can be prevented.

21 Claims, 4 Drawing Sheets

OPTICAL READING APPARATUS HAVING ACTIVE AND PASSIVE POWER SOURCE SWITCHING CIRCUITRY AND A STAND THEREOF

CROSS-REFERENCE TO RELATED APPLICATION

This application is related to Japanese Patent Application No. Hei Hei 8-296675, incorporated herein by reference.

BACKGROUND OF THE INVENTION

1. Field of the Invention

This invention relates to an optical reading apparatus for reading predetermined information from a display pattern such as a bar code with a built-in battery as a power source and to a stand therefor.

2. Description of Related Art

Conventionally, in a bar code reader handy terminal which is a type of cordless optical reading apparatus, the internal mechanism is driven with a built-in dry cell or a storage battery as a power source. When the consumption of this built-in battery is intense, replacement of the dry battery or recharging of the storage battery must be carried out frequently, and this has sometimes caused problems.

Because of this, devices which reduce consumption of the battery as much as possible with which it is possible to use the apparatus for a long time have been carried out. For example, when a reading operation has not been carried out for a long time even though a lamp for scanning was on, by extinguishing that lamp or on/off-controlling the power supply of a scanner part of a handy terminal as necessary on the basis of instructions from a host system side, electricity-saving is carried out as described in Japanese Unexamined Patent Publication No. Hei 5-189593 and Japanese Unexamined Utility Model Publication No. H.1-102956.

However, these conventional technologies only save electricity of the scanner part, and with respect to other parts, for example, parts carrying out data processing and the like such as decoding parts, and parts carrying out communication with the host system, because it is necessary to execute data communication interpreting commands from the host system side and carry out power supply on/off processing of the scanner part, in the end it has been necessary to leave the reader in a driven state.

Also, in cases in which a handy terminal is placed on a stand in which is built an interface for interfacing with a charging device and a host system, for preparation for data communication with the host system, at least the communication part for communicating with the host system has had to be driven.

Therefore, even when the handy terminal is not being used, it has been necessary to leave large parts of the handy terminal in a driven state, and satisfactory electricity-saving was not being carried out.

SUMMARY OF THE INVENTION

In view of the above problems of the prior art, this invention has an object of providing an optical reading apparatus and a stand thereof with which when driving is not necessary, not only the scanning part but also most other parts have their power supply turned off, and ample electricity-saving is possible and wasteful consumption of the battery is prevented.

The above objects are achieved according to a first aspect of the invention by providing an optical reading apparatus driven with a built-in battery as a power source which includes a processor having a read processor which shines light onto a display pattern external thereto and on the basis of reflected light from the display pattern reads data which the display pattern is expressing, and a communication processor which communicates with a host system by way of communication terminal of the host system side, a power supply control signal receiver for receiving a power supply control signal from the host system side, and a power supply switching unit which, according to a power supply control signal received by the power supply control signal receiver, carries out on/off control of the driving power supply from the battery to the processor.

This optical reading apparatus has a power supply control signal receiver and a power supply switching unit. This power supply control signal receiver is a mechanism only for receiving a power supply control signal from the host system side. The power supply switching unit only carries out on/off control of the driving power supply from the battery to the processor according to the power supply control signal received by the power supply control signal receiver. With these kinds of mechanism only for receiving a power supply control signal from the host system side and for only carrying out on/off control of the driving power supply from the battery to the processor, even if they are driven all the time, they hardly consume any power.

Therefore, when the optical reading apparatus is not used, if the host system side transmits a power supply control signal to the power supply control signal receiver commanding the driving power supply to the processor to be turned off, the power supply switching unit turns the driving power supply from the battery to the processor off.

In the case of the processor having the read processor and the communication processor, as discussed above, stopping the driving thereof is important for saving electricity, and if the power supply to these parts is turned off, driving of most of the parts of the optical reading apparatus stops. Furthermore, because the power consumption of the power supply control signal receiver and the power supply switching unit is extremely small, in the optical reading apparatus as a whole, ample electricity-saving is effected. Also, when for data communication or the like the optical reading apparatus is driven from the host system side, because the power supply control signal receiver receives a power supply control signal turning the driving power supply on from the host system side and the power supply switching unit immediately turns the driving power supply to the processor on, problems do not arise even in communication between the host system and the optical reading apparatus.

As the power supply control signal from the host system side, although it may be any signal, for example, to allow the signal to be received cordlessly, an optical signal or a magnetic signal can be given as an example.

Also, in addition to the above-mentioned configuration, a detector for detecting on the basis of a predetermined physical stimulus in a position different from the power supply control signal receiver whether or not the optical reading apparatus main body is disposed in a position such that communication with communication terminal of the host system side is possible may be provided. In this case, the power supply switching unit, when the power supply control signal received by the power supply control signal receiver expresses driving power supply ON to the processor and also it has been detected by the disposition detector that the optical reading apparatus main body is disposed in a position such that communication is possible, controls the driving power supply to the processor to ON, and when the power supply control signal received by the power supply control signal receiver is not driving power supply ON to the processor, or when it has not been detected by the disposition detector that the optical reading apparatus main body is disposed in a position such that communication is possible, controls the driving power supply to the processor to OFF.

When the host system side is transmitting a power supply control signal to the power supply control signal receiver expressing power supply on/off by presence or absence of a signal such as light or magnetism, depending on conditions in the vicinity where the optical reading apparatus is disposed, there is a risk that the power supply control signal receiver will catch light or magnetism existing as noise and mistake it for a power supply control signal turning the driving power supply on. Considering this kind of case, by the disposition detector detecting whether or not the optical reading apparatus main body is disposed in a position such that communication with the communication terminal of the host system side is possible, whether light or magnetism as noise has been caught or whether a proper power supply control signal has been caught becomes clear.

That is, when the disposition detector has detected that the optical reading apparatus main body is disposed in a position such that communication with the communication terminal of the host system side is possible, it is inferred that the signal which the power supply control signal receiver has received is a correct one and it is possible to carry out on/off control of the driving power supply to the processor correctly and driving power is not supplied to the processor as a result of noise, and consequently wasteful battery consumption can be prevented.

In this case, the disposition detecting unit can perform correct determination by detecting on the basis of a predetermined physical stimulus in a position different from the power supply control signal receiver. For example, if the power supply control signal receiver is receiving a power supply control signal in light or magnetism, if the disposition detector also detects the same light or magnetism as the power supply control signal receiver as the predetermined physical stimulus, because light or magnetism as noise, when the optical reading apparatus main body is disposed in a position such that communication with the communication terminal of the host system side is possible, is not detected by the power supply control signal receiver and the disposition detector, the power supply control signal receiver only detects the power supply control signal and nothing is detected by the disposition detector.

However, when the optical reading apparatus main body is disposed in a position other than a position such that communication with the communication terminal of the host system side is possible, light or magnetism as noise normally is detected by both the power supply control signal receiver and the disposition detector, and is not detected by only one of them.

If the power supply control signal receiver and the disposition detector are both detecting light or magnetism like this, it can be determined that this is light or magnetism as noise and that actually the power supply control signal receiver is not detecting a power supply control signal.

Therefore, by also determining the detection result of the disposition detector, it is possible to determine whether the power supply control signal receiver is detecting a power supply control signal from the host system side or whether it is detecting noise.

Normally, the power supply control signal is outputted from the host system side before the host system side communicates with the communication processor by way of the communication terminal.

The above-mentioned battery as a power source may alternatively be a storage battery. In this case, power for charging from outside may be supplied to this storage battery when the optical reading apparatus main body is disposed in a position such that communication with the communication terminal of the host system side is possible.

Also, when the battery is a storage battery, a power supply distributing unit for, when power for charging is being supplied from outside to the storage battery, distributing this power for charging to the power supply control signal receiver or the power supply switching unit as power for driving may be provided.

As a result of the use of this kind of power supply distributing unit, because only when the optical reading apparatus main body is disposed in a position such that communication with the communication terminal is possible is power for driving supplied to the power supply control signal receiver or the power supply switching unit, when the optical reading apparatus main body is not disposed in a position such that communication with the communication terminal is possible, power for driving is not supplied to the power supply control signal receiver or the power supply switching unit.

That is, only when a power supply control signal from the host system side can be received by the power supply control signal receiver are the power supply control signal receiver and the power supply switching unit both driven. Therefore, when a power supply control signal from the host system side cannot be received by the power supply control signal receiver, because power is not supplied to at least one of the power supply control signal receiver and the power supply switching unit, at least the power supply switching unit does not turn on the power supply to the processor. Thus, because on/off control of the driving power supply is not carried out even when noise exists around the power supply control signal receiver, wasteful consumption of the storage battery is avoided. Also, in this case, because for either one or both of the power supply control signal receiver and the power supply switching unit power supply from the storage battery is not being carried out, it is possible to prevent consumption of the storage battery even more.

A stand of an optical reading apparatus according to another aspect of the present invention includes a disposition part on which the optical reading apparatus is disposed, a communication terminal for allowing the communication processor of the optical reading apparatus disposed on the disposition part and the host system side to communicate, and a power supply control signal sending unit for sending a power supply control signal from the host system side to the power supply control signal receiver of the optical reading apparatus disposed on the disposition part.

Therefore, a power supply control signal requesting driving power supply ON to the processor is transmitted as necessary from the host system side to the power supply control signal receiver of the optical reading apparatus described above disposed on this stand, and on the basis of this power supply control signal, the power supply switching unit turns on the driving power supply to the processor. Therefore, in the optical reading apparatus, because it is not the case that the driving power supply to the processor is always on, the battery being wastefully consumed is prevented.

The power supply control signal that the power supply control signal sending unit transmits may be an optical signal or may be a magnetic signal, made to conform with the power supply control signal receiver of the optical reading apparatus.

Also, the stand preferable has a charger for supplying power for charging the storage battery of the optical reading apparatus disposed on the disposition part. When the optical reading apparatus has a power distributing unit for, when power for charging from outside is being supplied to its storage battery, distributing the power for charging to the power supply control signal receiver or the power supply switching unit as power for driving, power for driving is supplied to the power supply control signal receiver or the power supply switching unit of the optical reading apparatus by the charger of the stand. Therefore, as described above, it is possible to prevent consumption of the storage battery even more.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
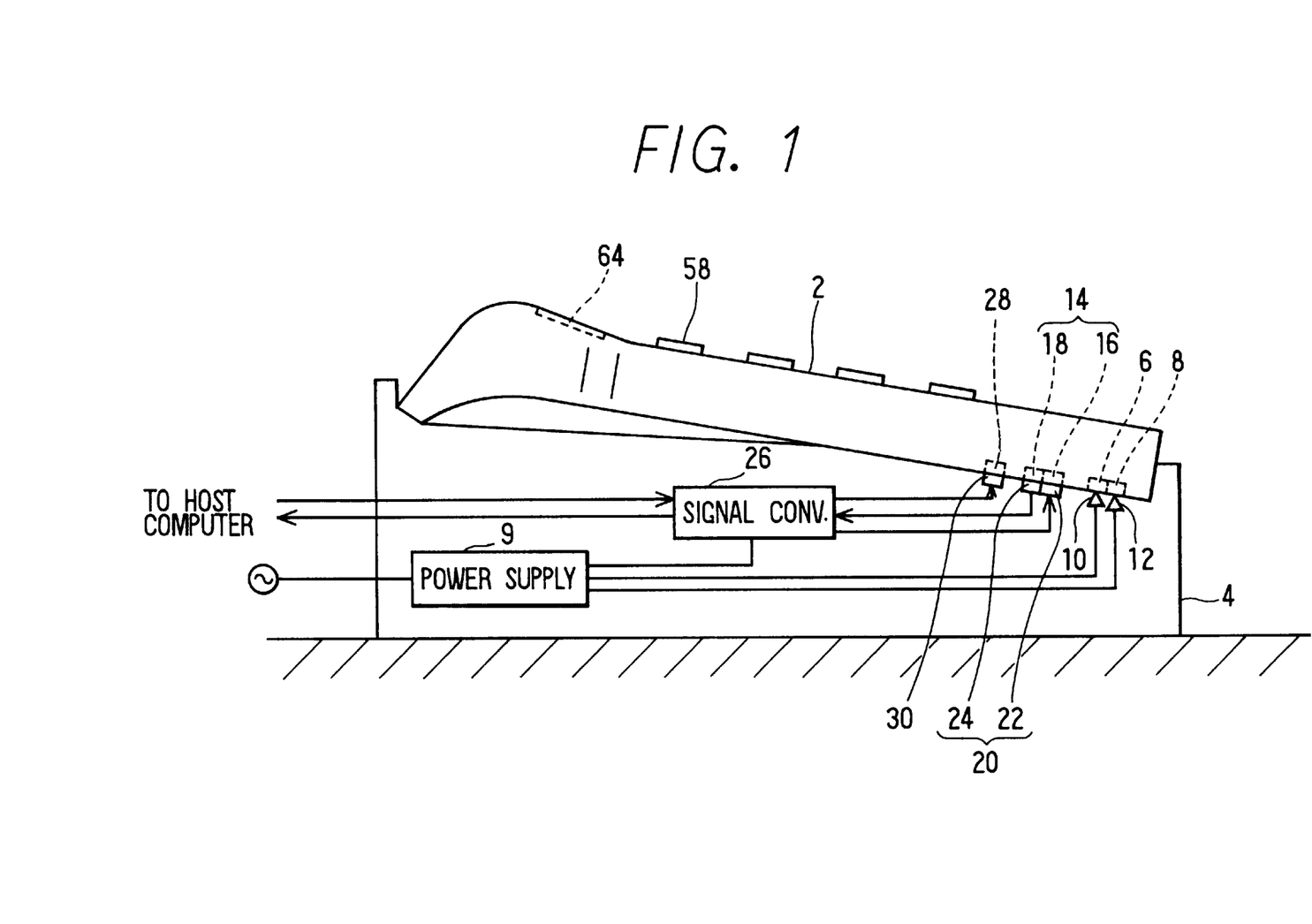
FIG. 1 is an explanatory view showing the outline construction of a bar code reader handy terminal and its stand according to a first preferred embodiment of the present invention.

FIG. 1 is an explanatory view showing the outline construction of a bar code reader handy terminal 2 as an optical reading apparatus and its stand 4 according to a first preferred embodiment of the present invention.

FIG. 1 shows the state of the bar code reader handy terminal 2 mounted on the stand 4. In this state, contact terminals 6 and 8 for charging the bar code reader handy terminal 2 are in contact with contact terminals 10 and 12 for power supply which supply power from a power supply circuit 9 of the stand 4, and the reader is in a state of charging with respect to a storage battery 72 which will be described later.

Also, in a light input-output part 14 of the bar code reader handy terminal 2, which carries out data communication by optical communication, a light-receiving device 16 faces a light-emitting device 22 of a light input-output part 20 and can receive light from the light-emitting device 22. Also, in the light input-output part 14 of the bar code reader handy terminal 2, a light-emitting device 18 faces a light-receiving device 24 of the light input-output part 20 of the stand 4 side and can emit light to the light-receiving device 24.

A control signal consisting of an electrical signal from a host computer as a host system is converted into an optical signal by a signal converting circuit 26 inside the stand 4 and emitted from the light-emitting device 22 as an optical signal to the light-receiving device 16 of the bar code reader handy terminal 2. Also, an optical signal emitted from the light-emitting device 18 of the bar code reader handy terminal 2 is received by the light-receiving device 24 of the stand 4 and converted into an electrical signal by the signal converting circuit 26 and outputted to the host computer side.

Also, on the bar code reader handy terminal 2 side, another light-receiving device 28 is provided, and facing this light-receiving device 28 on the stand 4 side another light-emitting device 30 is provided.

This light-receiving device 28 and the light-emitting device 30 are for sending and receiving power supply control signals, and when on the basis of an instruction from the host computer side the signal converting circuit 26 is outputting light from the light-emitting device 30, a power supply control signal indicative of on-control of a driving power supply is outputted from the host computer side. When on the basis of an instruction from the host computer side the signal converting circuit 26 is not outputting light from the light-emitting device 30, a power supply control signal indicative of off-control of the driving power supply is outputted.

When the bar code reader handy terminal 2 is not disposed in the correct position with respect to the stand 4, or when the bar code reader handy terminal 2 has been taken off the stand 4, the contact terminals 6 and 8 for charging, the light-receiving device 16, the light-emitting device 18 and the light-receiving device 28 of the bar code reader handy terminal 2 and the contact terminals 10 and 12 for power supply, the light-emitting device 22, the light-receiving device 24 and the light-emitting device 30 of the stand 4 are in a state where they cannot make contact and communicate.

Figure 2:
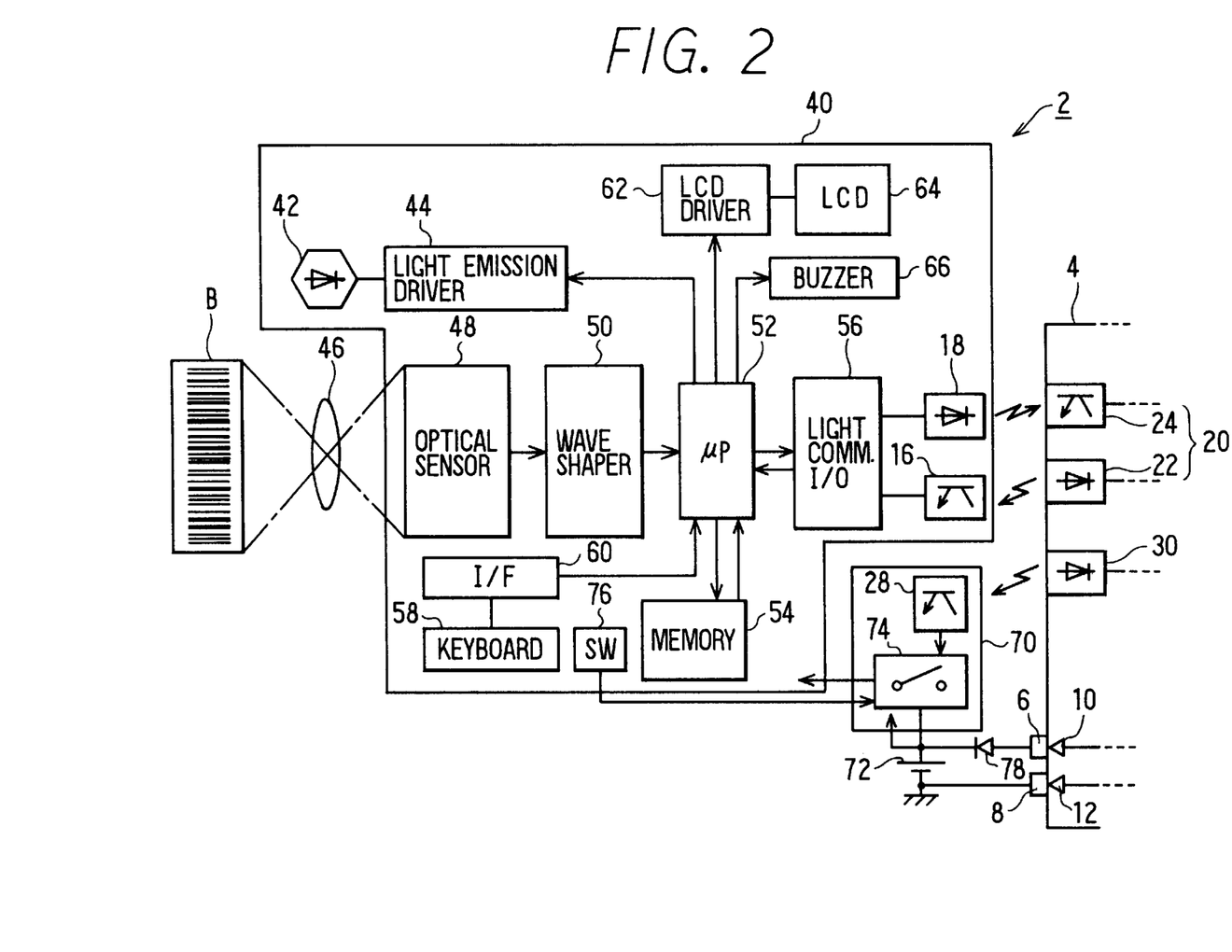
FIG. 2 is an outline block view of a bar code reader handy terminal according to the first embodiment.

FIG. 2 shows an outline block view of the bar code reader handy terminal 2. First, as a processor, a processor 40 which carries out bar code reading processing, data processing, management processing and optical communication processing has as a configuration for reading out the pattern of a bar code B a light emitting diode for illumination 42, a light emission driving circuit 44, a focusing lens 46 and an optical sensor 48 and so on, and when the light emitting diode for illumination 42 is caused to emit light by the light emission driving circuit 44, that light illuminates the bar code B outside the main case. Light reflected by the bar code B again enters the main case and is reflected by a reflecting mirror (not shown), enters the focusing lens 46 and forms an image of the bar code B on the optical sensor 48 in which light-receiving devices are arrayed linearly in a row. The optical sensor 48 having read by opto-electrically converting this image of the bar code B outputs an electrical signal expressing the pattern of the image by way of a waveform shaping part 50 to a microprocessor 52.

When the microprocessor 52 inputs the waveform data of the bar code B from the optical sensor 48, it decodes that waveform data to obtain information such as a product code that the bar code B is expressing and temporarily stores that information in a memory 54. This information stored in the memory 54, when the microprocessor 52 independently or when there has been a transmission request from the host computer side drives an optical communication input-output circuit 56, is transmitted from the light-emitting device 18 to the light-receiving device 24 of the stand 4 side. From the light-receiving device 24 it is transmitted by way of the signal converting circuit 26 to the host computer.

A ROM containing programs for realizing various functions of the bar code reader handy terminal 2, a RAM for temporarily storing data and so on, and a backup RAM for maintaining necessary data using a backup power source even when the power supply goes off are inside the memory 54.

Besides this, in the processor 40, operation input from a keyboard 58 provided at the front of the bar code reader handy terminal 2 is read in through an interface (I/F) 60, and to inform an operator, predetermined data is displayed on a liquid crystal display (LCD) 64 by way of an LCD driving circuit 62, and to inform the operator with a sound that the bar code B has been read, a buzzer device 66 is also provided.

Also, in the bar code reader handy terminal 2, a power supply part 70 and the storage battery 72 for supplying driving power to the whole processor 40 are provided. The power supply part 70 has the above-mentioned light-receiving device 28 and a switching circuit 74, and from the storage battery 72 power is supplied directly. The light-receiving device 28 and the switching circuit 74 only execute the function of on/off control of the switching circuit 74 simply on the basis of whether or not there is received light, and their power consumption, compared to the processor 40, is extremely low.

This switching circuit 74 is made up of transistors and so on, and when the light-receiving device 28 receives light, it turns on and supplies power from the storage battery 72 to the processor 40 as driving power. When the light-receiving device 28 ceases to receive light, it turns off and stops the supply of driving power to the processor 40.

Besides when the light-receiving device 28 has received light, the switching circuit 74 turns on also when a power supply switch 76 has been turned on, and the processor 40 can be made to function.

If the bar code reader handy terminal 2 is disposed in the correct position on the stand 4, because the contact terminals 10 and 12 for power supply of the stand 4 side make contact with the contact terminals 6 and 8 for charging, charging is carried out to the storage battery 72 by way of a diode 78.

In the first embodiment, as described above, when the bar code reader handy terminal 2 is disposed in the correct position on the stand 4, until the host computer causes the light-emitting device 30 to emit light, because the switching circuit 74 is still off, power is not supplied to the whole processor 40. Therefore, in this state, simply, if the host computer side, by way of the light-emitting device 22, for example, sends goods in/out data of a product to the bar code reader handy terminal 2 and tries to store it in the memory 54, or tries to read out product data stored in the memory 54, the processor 40, because the driving power source is off, does not function at all.

However, when on the host computer side an instruction turning the light-emitting device 30 on is first outputted to the signal converting circuit 26 of the stand 4 and the light-emitting device 30 is actuated, the light-receiving device 28 of the power supply part 70 of the bar code reader handy terminal 2 side receives light from the light-emitting device 30 and sends a power supply control signal indicative of driving the power supply ON to the switching circuit 74. As a result of this, the switching circuit 74 carries out control to turn on the driving power supply from the storage battery 72 to the processor 40.

In this way, the power supply to the processor 40 turns on and the microprocessor 52 operates and it becomes possible to carry out optical communication by way of the light-receiving device 16 and the light-emitting device 18. At this time, the host computer side outputs an instruction to store data in the memory 54 or read out data from the memory 54 by way of the light-emitting device 22 of the signal converting circuit 26 of the stand 4 side to the light-receiving device 16 side. As a result, the microprocessor 52 carries out the respective processing.

Also, when the host computer side has finished processing with respect to the bar code reader handy terminal 2, when it instructs the signal converting circuit 26 and deactuates the light-emitting device 30, the light-receiving device 28 of the power supply part 70 of the bar code reader handy terminal 2 side sends a power supply control signal indicative of driving the power supply OFF to the switching circuit 74 and as a result of this, the switching circuit 74 carries out control to turn off the supply of power from the storage battery 72 to the processor 40.

As a result of this, the power supply is turned off and the functioning of the processor 40 stops.

Therefore, because the processor 40 of the bar code reader handy terminal 2 has its power supply turned on by the host computer when necessary, when awaiting instructions from the host computer side the processor 40 is not in operation. That which is being driven is the power supply part 70 only, and because with driving of the power supply part 70, compared to driving of the processor 40 or the microprocessor 52, the optical communication input-output circuit 56 and the light-receiving device 16, the consumption of the storage battery 72 is extremely low, and excessive consumption of the storage battery 72 can be prevented.

Embodiment 2

Figure 3:
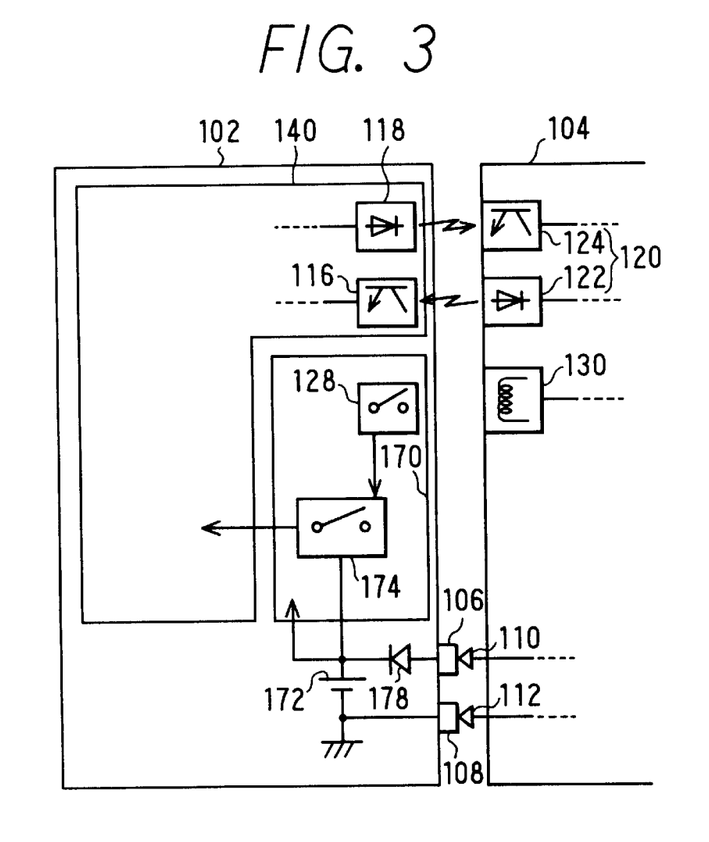
FIG. 3 is a main part block view of a bar code reader handy terminal and a stand according to a second preferred embodiment of the present invention.

FIG. 3 shows a bar code reader handy terminal 102 and a stand 104 according to a second preferred embodiment of the present invention.

The main point of the bar code reader handy terminal 102 of the second embodiment which differs from the bar code reader handy terminal 2 of the first embodiment is the point that, in a power supply part 170, instead of the light-receiving device 28, a reed switch 128 is provided, and the rest is essentially the same. Also, the stand 104 of the second embodiment differs from the stand 4 of the first embodiment in that instead of the light-emitting device 30 an electromagnet 130 is provided, and the rest is the same. The reed switch 128 turns on when a magnetic field applied thereto becomes greater than a predetermined level and outputs an on-signal to a switching circuit 174.

When a power supply control signal indicative of on-controlling the driving power supply is inputted from the host computer side into a signal converting circuit inside the stand 104, a current flows through the electromagnet 130 and a magnetic force is generated by the electromagnet 130. As a result of this, the reed switch 128 of the bar code reader handy terminal 102 disposed in the correct position on the stand 104 closes. When an on signal from this switch 128 is inputted into the switching circuit 174, the switching circuit 174 turns on and driving power is outputted from a storage battery 172 to the processor 140 side.

Therefore, the processor 140 drives and data communication becomes possible with the host computer side by means of the light-receiving device 116 and the light-emitting device 118 and by way of the light-emitting device 122 and the light-receiving device 124 of the light input-output part 120 of the stand 104 side.

When data communication ends and a power supply control signal indicative of off-controlling the driving power supply is inputted from the host computer side, the current which had been flowing to the electromagnet 130 is cut off and the magnetic force which had been generated by the electromagnet 130 ceases to exist. As a result, the reed switch 128 turns off and this off-signal is inputted into the switching circuit 174 and the switching circuit 174 turns off and stops the power which had been being supplied from the storage battery 172 to the processor 140 side. Therefore, driving of the processor 140 stops and consumption of the storage battery 172 is prevented.

Embodiment 3

Figure 4:
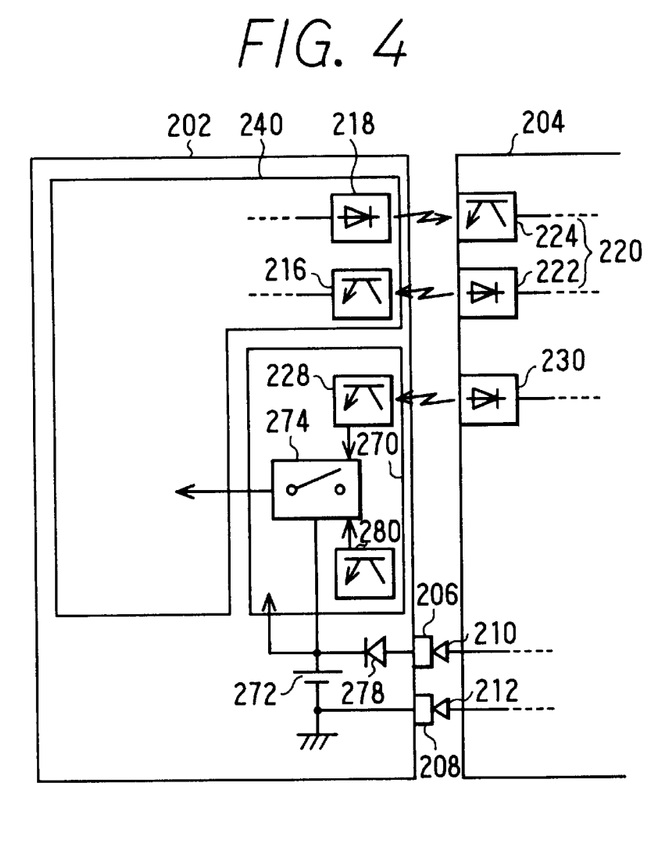
FIG. 4 is a main part block view of a bar code reader handy terminal and a stand according to a fourth preferred embodiment of the present invention.

FIG. 4 shows a bar code reader handy terminal 202 and a stand 204 according to a third preferred embodiment of the present invention.

The main point of the bar code reader handy terminal 202 of the third embodiment which differs from the bar code reader handy terminal 2 of the first embodiment is that, in the power supply part 270, in addition to the light-receiving device 228, a second light-receiving device 280 is provided so that it can receive light from outside, and the switching circuit 274 receives signals from the two light-receiving devices 228, 280 to execute on/off control of the driving power supply, and the rest is the same. The stand 204 of this embodiment 3 is of the same construction as that of embodiment 1.

In the switching circuit 274, when an off-signal is being inputted from the light-receiving device 280, in the same way as in the case of the first embodiment, driving power supply to the processor 240 is controlled according to the on/off state of the signal from the light-receiving device 228.

Because this second light-receiving device 280 is disposed in a different position from the light-receiving device 228 with respect to the main body of the bar code reader handy terminal 202 when the bar code reader handy terminal 202 is disposed in the correct position on the stand 204, the light-receiving part of the second light-receiving device 280 is covered by the main body of the stand 204 and no light whatsoever reaches it. With regard to the light-receiving device 228, because it faces the light-emitting device 230 of the stand 204 side as in the first embodiment, light from the light-emitting device 230 is receivable.

Therefore, when the bar code reader handy terminal 202 is disposed in the correct position on the stand 204, because to the switching circuit 274 from the second light-receiving device 280 is always off, it functions in the same way as in the first embodiment.

On the other hand, when the bar code reader handy terminal 202 is placed not on the stand 204 but in another location such as on a desk, light from around the bar code reader handy terminal 202 (sunlight, electric light or the like) may be received by the light-receiving device 228 as noise. In this case, if the switching circuit 274, like the switching circuit 74 of the first embodiment, is on/off controlled by only a signal from a single light-receiving device 28, due to noise, it would supply power of the storage battery 272 to the processor 240. However, in this third embodiment, through the use of the second light-receiving device 280, when the second light-receiving device 280 is outputting an on-signal, whatever the signal from the light-receiving device 228 is, the switching circuit 274 maintains off-control.

Thus, the bar code reader handy terminal 202 of the third embodiment, together with the effects of the first embodiment, further provides the effect that even if noise light is received by the light-receiving device 228, because power is not supplied to the processor 240, wasteful consumption of power due to noise is avoided.

Embodiment 4

Figure 5:
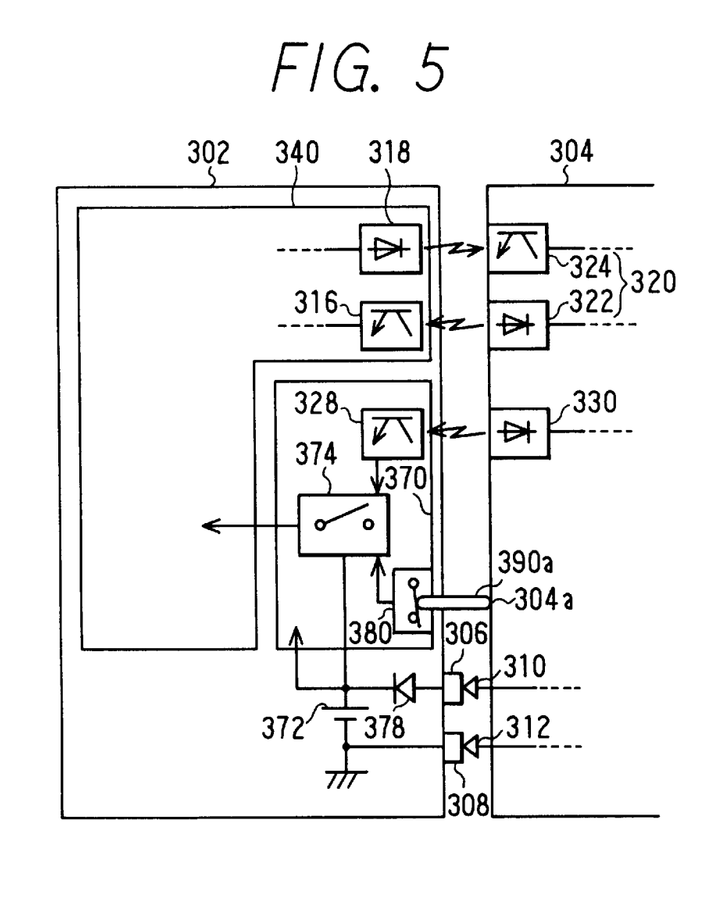
FIG. 5 is a main part block view of a bar code reader handy terminal and a stand according to a fourth preferred embodiment of the present invention.

FIG. 5 shows a bar code reader handy terminal 302 and a stand 304 according to a fourth preferred embodiment of the present invention.

The main point of the stand 304 of the fourth embodiment which differs from the bar code reader handy terminal 202 of the third embodiment is the that, in the power supply part 370, instead of the second light-receiving device 280, a limit switch 380 is provided, and when the limit switch 380 is outputting an on-signal, in the same way as in the case of the first embodiment, according to the on/off of the signal from the light-receiving device 328, the switching circuit 374 controls the on/off state of the driving power supply to the processor 340, but when the limit switch 380 is outputting an off-signal, whatever the signal from the light-receiving device 328 is, the driving power supply to the processor 340 is controlled to be off. The rest of the construction is the same as the third embodiment.

When this bar code reader handy terminal 302 is disposed in the correct position on the stand 304, as a result of a contact terminal 390a of the limit switch 380 making contact with a part 304a of the stand 304, the limit switch 380 closes on. With regard to the light-receiving device 328, because it faces the light-emitting device 330 of the stand 304 side as in the first embodiment, it can receive light from the light-emitting device 330.

Therefore, when the bar code reader handy terminal 302 is disposed in the correct position on the stand 304, because an on-signal is inputted from the limit switch 380 into the switching circuit 374, it functions in the same way as in the first embodiment.

On the other hand, when the bar code reader handy terminal 302 is placed not on the stand 304 but in another location such as on a desk, light from around the bar code reader handy terminal 302 may be received by the light-receiving device 328 as noise. In this case, because the limit switch 380 is not in contact with the stand 304 and is in a non-contacting state, an off-signal is outputted from the limit switch 380. Because of this, whatever the signal from the light-receiving device 328 is, the switching circuit 374 controls the driving power supply to the processor 340 to be off.

Thus, the bar code reader handy terminal 302 of the fourth embodiment provides the same effects as those of the third embodiment.

Embodiment 5

Figure 6:
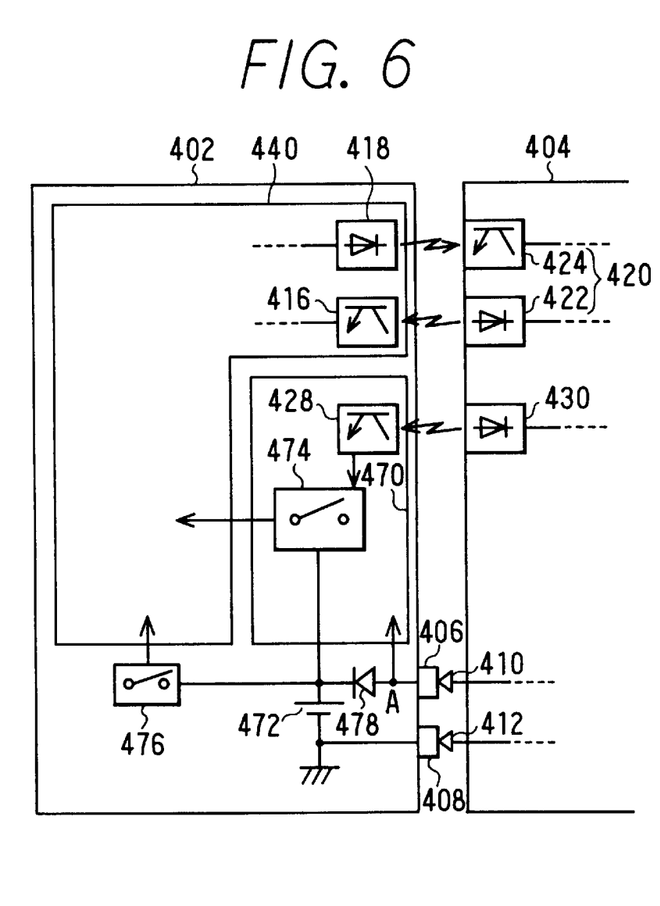
FIG. 6 is a main part block view of a bar code reader handy terminal and a stand according to a fifth preferred embodiment of the present invention.

FIG. 6 shows a bar code reader handy terminal 402 and a stand 404 according to a fifth preferred embodiment of the present invention.

The main point of the bar code reader handy terminal 402 of the fifth embodiment which differs from the bar code reader handy terminal 2 of the first embodiment is that the power supply to the power supply part 470 is carried out not from the storage battery 472 side of the diode 478 but rather from the contact terminals 406 for charging side (point A in the Figure) of the diode 478. The rest of the construction is the same as that of the first embodiment.

When this bar code reader handy terminal 402 has been set on the stand 404, because by way of the contact terminals 410 and 412 for power supply and the contact terminals 406 and 408 for charging, power for driving is supplied to the power supply part 470, the power supply part 470 functions like the power supply part 70 of the first embodiment. That is, according to the power supply control signal to the light-receiving device 428 from the host computer side coming via the light-emitting device 430 of the stand 404 side, the switching circuit 474 performs on/off control of the power supply for the processor 440.

On the other hand, when the bar code reader handy terminal 402 is placed not on the stand 404 but in another location such as on a desk, light from around the bar code reader handy terminal 402 may be received by the light-receiving device 428 as noise. In this case, because the contact terminals 41- and 412 for power supply of the stand 404 side are not in contact with the contact terminals 406 and 408 for charging, supply of power from the stand 404 side to point A of FIG. 6 is not carried out and, because the diode 478 is in between, power from the storage battery 472 is not supplied to the point A.

Consequently, because the switching circuit 474 does not drive and maintains an off-state since power supply to the power supply part 470 is not provided, power is not supplied from the storage battery 472 to the processor 440 and wasteful power consumption is avoided.

Thus, the bar code reader handy terminal 402 of the fifth embodiment provides the same effects as in the fourth embodiment.

In the fifth embodiment, because the power supply switch 476 simply supplies power to the processor 440, at the time of reading of a bar code B by an operator, the processor 440 is driven with power supplied by the power supply switch 476.

If the power supply from point A is made only the light-receiving device 428 of the power supply part 470 and with regard to the switching circuit 474 power is supplied from the storage battery 472 side in the same way as in the first through fourth embodiments, also with regard to the power supply switch 476, on/off control of the switching circuit 474 may be made as in the first through fourth embodiments.

Other Embodiments

In the third through fifth embodiments, in the same way as in the second embodiment, instead of the light-emitting devices 230, 330, 430, electromagnets, and instead of the light-receiving devices 228, 328, 428, reed switches may be used.

Also, although in the first through fifth embodiments storage batteries 72, 172, 272, 372, 472 were used as the power source battery, dry batteries may be used or removable storage batteries may be used. In the case of a dry battery or a removable storage battery, on the stand 4, 104, 204, 304, 404 side, the circuit for charging and the contact terminals for power supply 10, 12, 110, 112, 210, 212, 310, 312, 410, 412 are not necessary.

It should be noted that "radiant energy" as used herein and in this appended claims refers to light energy, magnetic energy, electromagnetic energy and other forms of energy which may be used as described above.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An optical reading apparatus driven with a built-in battery as a power source, the apparatus including a reading terminal comprising:

a processor including a read processor and light source which shines light onto a display pattern external to the optical reading apparatus and, on the basis of reflected light from the display pattern, reads data which the display pattern is expressing; and a communication processor which communicates with a host system;

power supply control signal receiving means for receiving a power supply control signal from the host system side; and power supply switching means for, responsive to a power supply control signal received by the power supply control signal receiving means, carrying out on/off control of the driving power supply from the battery to the processor.

2. The apparatus of claim 1, wherein the power supply control signal receiving means is for receiving an optical signal as the power supply control signal from the host system side.

3. The apparatus of claim 1, wherein the power supply control signal receiving means is for receiving a magnetic signal as the power supply control signal from the host system side.

4. The apparatus of claim 1, the reading terminal further comprising:

disposition detecting means for detecting, on the basis of a signal representative of a predetermined physical condition in a position different from a position of the power supply control signal receiving means, whether or not the reading terminal is disposed in a position such that communication with the host system side is possible;

wherein the power supply switching means is further for, when the power supply control signal received by the power supply control signal receiving means is indicative of driving power supply ON to the processor and the disposition detecting means has detected that the reading terminal is disposed in a position such that communication is possible, enabling the driving power supply to the processor; and the power supply switching means is further for, when the power supply control signal received by the power supply control signal receiving means is not enabling power supply to the processor, and also when the disposition detecting means is not detecting that the reading terminal is disposed in a position such that communication is possible, controlling the driving power supply to the processor to be turned off.

5. The optical reading apparatus of claim 4, wherein the predetermined physical condition is an illumination level.

6. The apparatus of claim 4, wherein the predetermined physical condition is a contact pressure.

7. The apparatus of claim 1, wherein the power supply control signal from the host system side is outputted from the host system side before the host system side communicates with the communication processor.

8. The apparatus of claim 1, wherein:

the battery is a storage battery; and external power for charging is supplied to the storage battery when the reading terminal is disposed in a position such that communication with the host system is possible.

9. The apparatus of claim 8, further comprising charging means for supplying power for charging the storage battery of the reading terminal when disposed on the disposition part.

10. The apparatus of claim 1, wherein:

the battery is a storage battery; and the reading terminal further comprises power supply distributing means for, when external power for charging is being supplied to the storage battery, distributing the power for charging to at least one of the power supply control signal receiving means and the power supply switching means as power for driving.

11. The apparatus of claim 10, further comprising charging means for supplying power for charging the storage battery of the reading terminal when disposed on the disposition part.

12. The apparatus of claim 1, further comprising a stand for the reading terminal, the stand comprising:
   a disposition part on which the reading terminal may be disposed;
   communication terminal means for allowing the communication processor of the reading terminal disposed on the disposition part and the host system side to communicate; and
   power supply control signal transmitting means for transmitting the power supply control signal from the host system side to the power supply control signal receiving means of the reading terminal disposed on the disposition part.

13. The apparatus according to claim 12, wherein the power supply control signal transmitting means is for transmitting an optical signal as the power supply control signal.

14. The apparatus of claim 12, wherein the power supply control signal transmitting means is for transmitting a magnetic signal as the power supply control signal.

15. A cordless portable information reading apparatus, the apparatus including a handy terminal comprising:
   a power source for driving the apparatus;
   reading means for shining light onto optical indicia external to the apparatus and reading the content of the optical indicia;
   communicating means for transferring the content of the optical information read by the reading means via communication with a host system;
   power supply termination means for terminating a power supply from the built-in power source to the reading means and the communicating means; and
   supply renewing means for, when receiving more than a predetermined amount of radiant energy operating the power supply terminating means, renewing the power supply from the built-in power source to at least the communicating means;
   wherein the host system causes renewal of the power supply from the built-in power source to at least the communicating means by transmitting more than the predetermined amount of radiant energy.

16. The apparatus of claim 15, wherein the supply renewing means is for renewing the power supply from the built-in power source to at least the communicating means only when it has received radiant energy from the host system.

17. The apparatus of claim 16, wherein the supply renewing means comprises:
   a first detector for detecting radiant energy; and
   a second detector, physically separated from the first detector, for detecting radiant energy;
   wherein the supply renewing means is for renewing the power supply only when the first detector detects radiant energy and the second detector detects that the handy terminal is in the predetermined position.

18. The apparatus of claim 17, wherein the second detector detects the same type of radiant energy as the first detector.

19. The apparatus of claim 15, further including a stand comprising:
   transmitting means for, on the basis of an instruction from the host system, transmitting more than the predetermined amount of radiant energy to the supply renewing means; and
   additional power source means for supplying power to the supply renewing means from a power source other than the built-in power source.

20. The apparatus of claim 15, wherein the supply renewing means is for receiving light energy.

21. The apparatus of claim 15, wherein the supply renewing means is for receiving magnetic energy.

* * * * *